(12) United States Patent
Ni et al.

(10) Patent No.: US 7,479,039 B2
(45) Date of Patent: Jan. 20, 2009

(54) MANUFACTURING PROCESS FOR A SUPER-DIGITAL (SD) FLASH CARD WITH SLANTED ASYMMETRIC CIRCUIT BOARD

(75) Inventors: Jim Chin-Nan Ni, San Jose, CA (US);
Abraham C. Ma, Fremont, CA (US);
Paul Hsueh, Concord, CA (US);
Ming-Shiang Shen, Taipei Hsien (TW)

(73) Assignee: Super Talent Electronics, Inc., San Jose, CA (US)

( * ) Notice: Subject to any disclaimer, the term of this patent is extended or adjusted under 35 U.S.C. 154(b) by 0 days.

(21) Appl. No.: 11/846,733

(22) Filed: Aug. 29, 2007

(65) Prior Publication Data

US 2008/0003883 A1    Jan. 3, 2008

Related U.S. Application Data

(63) Continuation-in-part of application No. 11/309,844, filed on Oct. 11, 2006, and a continuation-in-part of application No. 10/913,868, filed on Aug. 6, 2004, now Pat. No. 7,264,992, and a continuation-in-part of application No. 11/624,667, filed on Jan. 18, 2007.

(51) Int. Cl.
*H01R 13/66* (2006.01)

(52) U.S. Cl. .................. 439/620.15; 439/66

(58) Field of Classification Search ............ 439/620.15, 439/66–67, 945–946; 361/737, 684; 257/679, 257/693; 438/121; 365/200–201
See application file for complete search history.

(56) References Cited

U.S. PATENT DOCUMENTS

| | | | | |
|---|---|---|---|---|
| 6,166,444 A | * | 12/2000 | Hsuan et al. | 257/777 |
| 7,296,098 B2 | * | 11/2007 | Shih | 710/13 |
| 2004/0017707 A1 | * | 1/2004 | Wallace et al. | 365/200 |

* cited by examiner

*Primary Examiner*—Jean F Duverne
(74) *Attorney, Agent, or Firm*—Stuart T. Auvinen; gPatent LLC

(57) ABSTRACT

A flash-memory device has a printed-circuit board assembly (PCBA) with a PCB with a flash-memory chip and a controller chip. The controller chip includes an external Secure-Digital (SD) interface, and a processing unit to read blocks of data from the flash-memory chip. The PCBA is encased inside an upper case and a lower case, with SD contact pads on the PCB that fit through contact openings in the upper case. Dividers between openings in the upper case that expose the SD contact pads also support the PCB at a slanted angle to the centerline of the device. The PCB slants upward at the far end to allow more thickness for the chips mounted to the bottom surface of the PCB, and slants downward at the insertion end to position the SD contact pads near the centerline. A metal switch-bar or an over-molded controller die may be substituted.

22 Claims, 9 Drawing Sheets

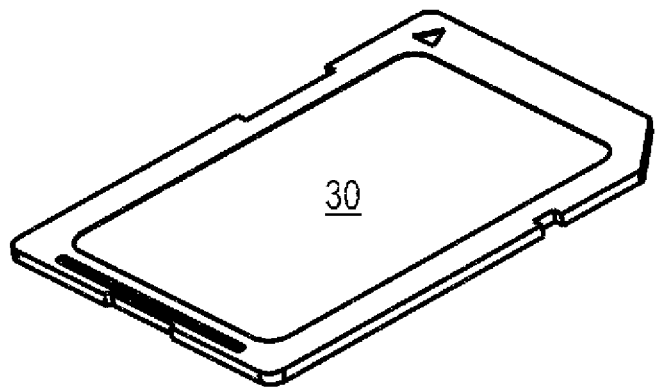
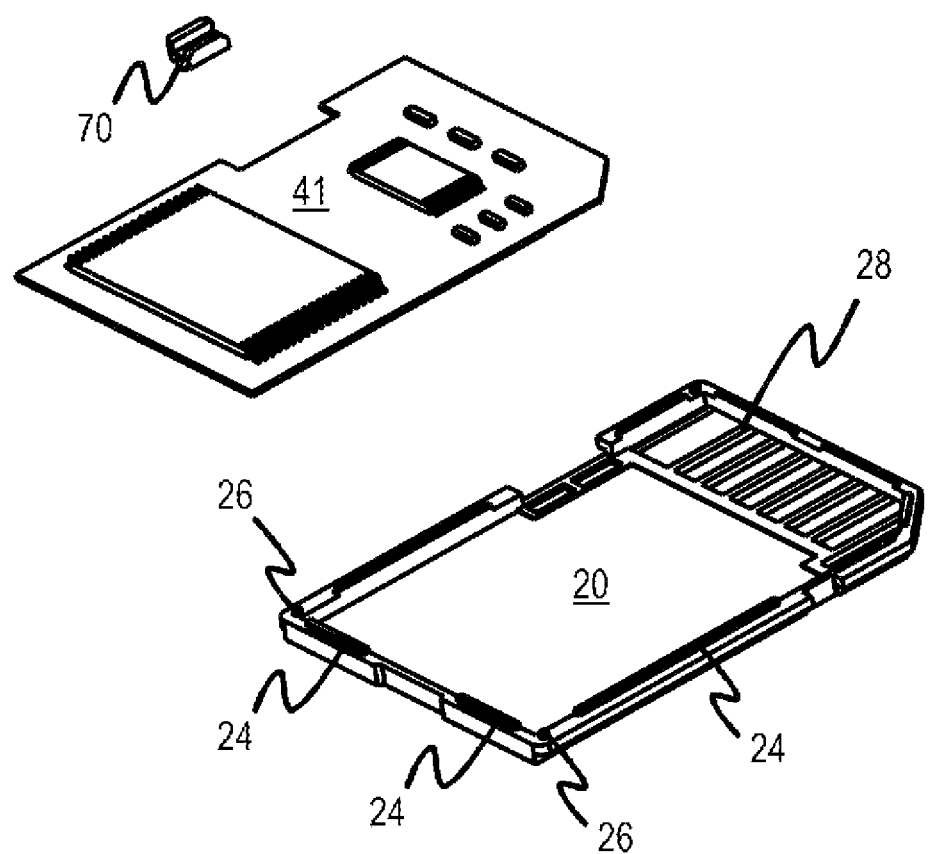
FIG. 2

TOP VIEW

BOTTOM VIEW

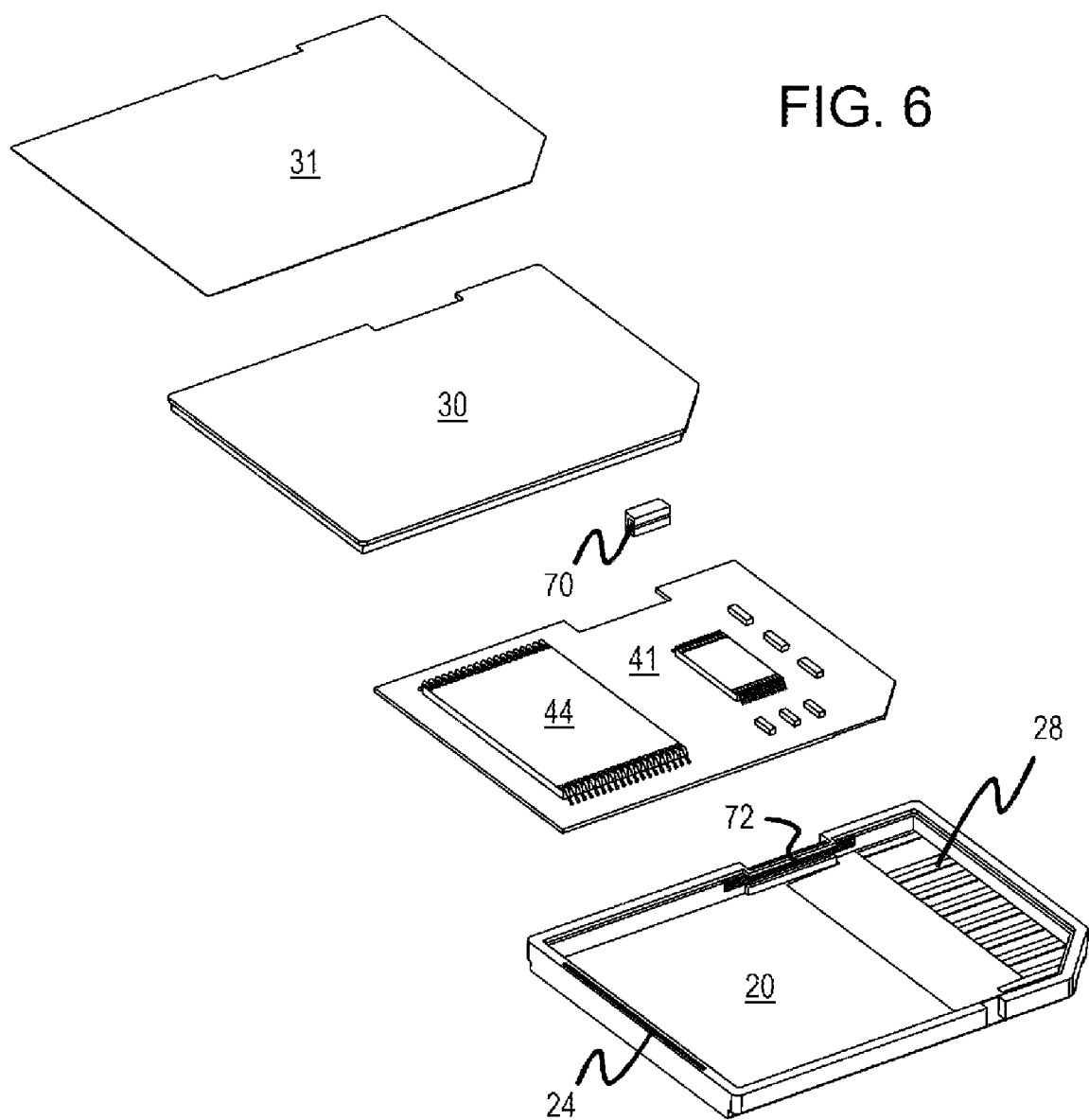

BOTTOM VIEW

MANUFACTURING PROCESS FOR A SUPER-DIGITAL (SD) FLASH CARD WITH SLANTED ASYMMETRIC CIRCUIT BOARD

RELATED APPLICATION

This is a continuation-in-part (CIP) of the co-pending application for "Electronic Data Storage Medium with Fingerprint Verification Capabilit", U.S. Ser. No. 11/624,667 filed Jan. 18, 2007, which is a continuation of U.S. Pat. No. 7,257,714. This application is a continuation-in-part (CIP) of the co-pending application for "Removable flash integrated memory module card and method of manufacture", U.S. patent application Ser. No. 10/913,868, filing date: Aug. 6, 2004 and a CIP of "Secure-Digital (SD) Flash Card with Slanted Asymmetric Circuit Board", U.S. Ser. No. 11/309,844 filed Oct. 11, 2006.

FIELD OF THE INVENTION

This invention relates flash-memory cards, and more particularly to manufacturing a flash card with a slanted printed-circuit board (PCB).

BACKGROUND OF THE INVENTION

Flash-memory cards using standards such as compact-flash (CF), Multi-Media Card/Secure Digital (MMC/SD), and Sony's MemoryStick are popular today. Such flash cards may be used in consumer devices such as digital cameras, music players, phones, palm or other portable computers, and may be inserted into personal computers and printers. Various extensions of these standards exist, such as Super Digital, an extension of Secure Digital (SD) that does not have all the security features and digital-rights management features of SD. MMC/SD is popular due to its small size, about the size of a postage stamp.

Data files stored on such as flash card, or on a more traditional floppy disk or diskette may require a password for access, or may use encryption to secure the data within the file. Confidential documents can be delivered over a network by adding safety seals and impressions. However, the confidential data is at risk due to breaking of the passwords, encryption codes, safety seals and impressions, thereby resulting in unsecure transfer of the information.

The grand-parent application (U.S. Ser. No. 09/478,720, filed Jan. 6, 2000) disclosed an electronic data storage medium that had fingerprint verification capability. FIG. 1 is a schematic circuit block diagram illustrating an electronic data storage medium disclosed in the grand-parent application.

The electronic data storage medium with fingerprint verification capability can be accessed by external computer 9 using input/output interface circuit 5, which may use a Personal-Computer Memory Card International Association (PCMCIA), RS-232, or similar interface to communicate. The electronic data storage medium can be located inside or outside of the external computer.

The electronic data storage medium with fingerprint verification capability is packaged in card body 1, and includes processing unit 2, memory device 3, fingerprint sensor 4, input/output interface circuit 5, display unit 6, power source 7, and function key set 8.

Memory device 3 can be a flash memory device that stores data files. Fingerprint sensor 4 scans a fingerprint of a user to generate fingerprint scan data. Processing unit 2 connects to other components and can operate in various modes, such as a programming mode, a data retrieving mode, and a data resetting mode. Power source 7 supplies electrical power to processing unit 2. Function key set 8 allows the user to input a password that is verified by processing unit 2. Display unit 6 shows the operating status of the electronic data storage medium.

The electronic data storage medium may be a subset of the electronic data storage medium with fingerprint verification capability. The electronic data storage medium is packaged in card body 1, and includes processing unit 2, memory device 3, and input/output interface circuit 5. While such an electronic data storage medium is useful, manufacturing methods and product designs are desired that can be cost-effectively produced. In particular, designs for making the card body or casing that encapsulates the electronic components are desired. To reduce the cost and size, designs of the electronic data storage medium that eliminate some costly components, such as the fingerprint sensor, function key set, and display, are desirable. An external power source may further reduce costs and size. Such device designs can allow a low-cost electronic data storage medium to be manufactured.

Another related application, U.S. Ser. No. 11/309,844, disclosed a flash-memory device with a slanted PCB circuit board. The slanting of the PCB allows the flash-memory and controller chips to be mounted on one side, and the metal contacts for the SD standard to be on the other side of the PCB. The PCB is tilted to allow both the chips and the contact pads to fit within the card body without otherwise increasing the thickness of the card body. Further refinements to the flash-memory device with the slanted PCB are desired.

BRIEF DESCRIPTION OF THE DRAWINGS

FIG. 2 shows a parts view of a Secure-Digital flash card assembled using an ultrasonic-press process.

FIG. 6 shows a parts view of a Secure-Digital flash card with a metal switch-bar that is molded into the upper case.

DETAILED DESCRIPTION

Figure 1:
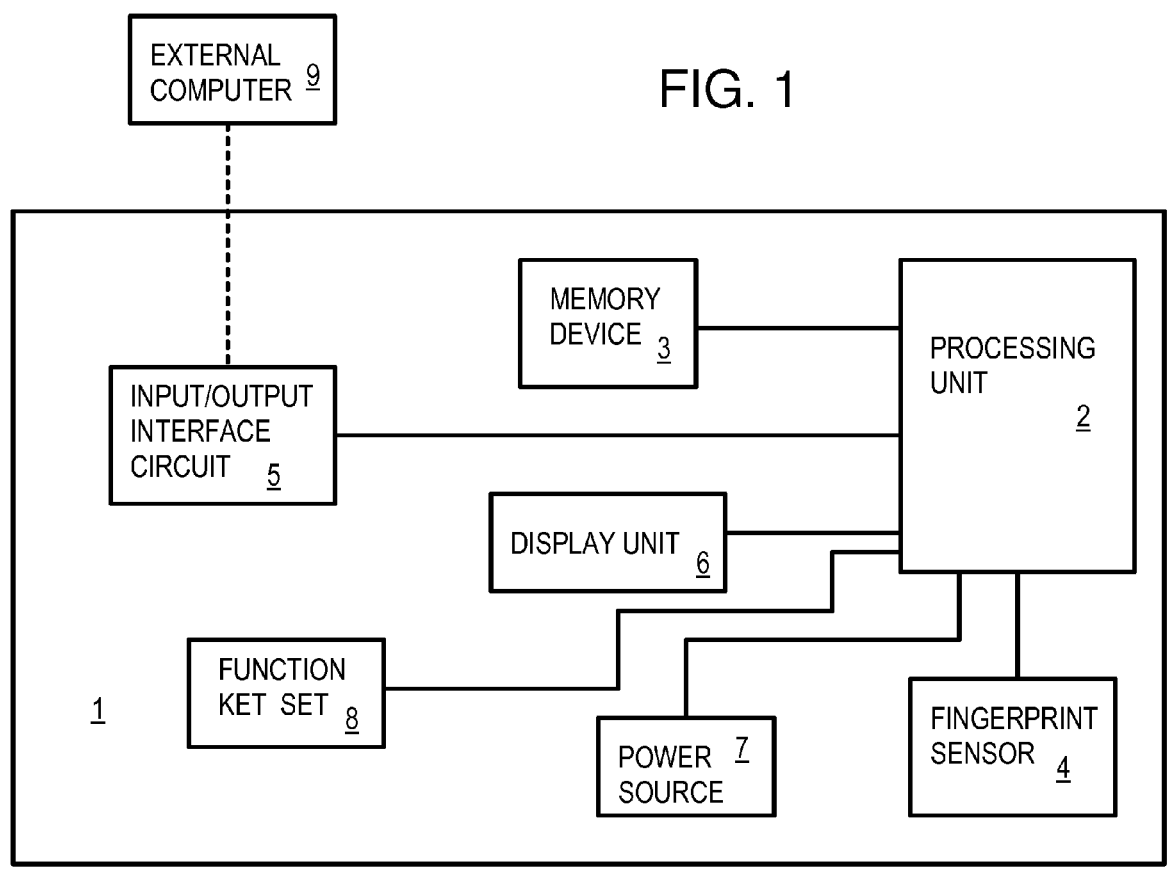
FIG. 1 is a schematic circuit block diagram illustrating an electronic data storage medium disclosed in the grand-parent application.

The present invention relates to an improvement in flash-memory cards. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have developed a variety of manufacturing methods for electronic data storage medium devices such as flash-memory cards that can replace hard disk drives with solid-state flash memory. Flash memory chips currently employ electrically-erasable programmable read-only memory (EEPROM) are the primary storage medium. Such flash memory is more rugged than rotating magnetic disks.

The inventors have realized that the card body may be constructed from a two-piece casing that encloses a printed-circuit board assembly (PCBA) that has a circuit board with flash-memory and controller chips mounted thereon. The two-piece casing can be assembled together and sealed in a variety of ways, such as with snaps, tabs and slots, ultrasonic ridges, adhesives, and screw fasteners.

The inventors have further realized that the card body can conform to existing flash-card standards, such as Secure Digital (SD). However, Secure Digital is a particularly thin and flat standard compared to other standards such as Compact Flash. Being able to mount the chips on a PCB within such as SD card is challenging. However, the inventors have discovered that the PCB inside a SD card may be slanted within the SD card body for a better fit. The slanting of the PCB allows the flash-memory and controller chips to be mounted on one side, and the metal contacts for the SD standard to be on the other side of the PCB. The PCB is tilted to allow both the chips and the contact pads to fit within the card body without otherwise increasing the thickness of the card body.

FIG. 2 shows a parts view of a Secure-Digital flash card assembled using an ultrasonic-press process. PCBA 41 is enclosed by upper case 20 and lower case 30. PCBA 41 is a circuit board such as a printed-circuit board (PCB) with wiring traces, and has a flash-memory chip and a controller chip and components soldered to the bottom surface (facing upward in this view) of the circuit board. PCBA 41 also has SD contact pads 42 (hidden on the other side of PCBA 41) formed along the front edge of the circuit board. SD contact pads 42 mate with socket pads on a SD socket that the Secure-Digital flash card fits into, such as on a host or in an electronic device.

Upper case 20 has contact openings between dividers 28 along the front side. SD contact pads 42 are exposed by contact openings between dividers 28 when PCBA 41 is assembled into upper case 20, thus allowing SD contact pads 42 to make electrical connection when inserted into an SD socket.

During assembly, PCBA 41 is fitted inside upper case 20. PCBA 41 may be fitted at a slanting angle within upper case 20 (See FIG. 5) to allow SD contact pads 42 to fit within contact openings between dividers 28 while still having room within upper case 20 and lower case 30 for chips mounted to the bottom side of PCBA 41. The slanting angle may be 1-2 degrees in some embodiments, depending on the length of and the thickness between the upper and lower cases.

The sub-assembly of PCBA 41 inside upper case 20 is then fitted to lower case 30. Positioning posts 26 formed at the corners of upper case 20 fit into positioning holes in lower case 30 to help align cases 20, 30 during assembly.

Ultrasonic ridges 24 are formed on the perimeter rim of upper case 20 touch the rim of lower case 30 as cases 20, 30 are fitted together. Ultrasonic energy is applied while pressing cases 20, 30 together, causing ultrasonic vibrations along ultrasonic ridges 24. Ultrasonic ridges 24 are heated by the friction of rubbing against the rim of lower case 30 and the pressure from the ultrasonic press machine. This heating partially melts the plastic of ultrasonic ridges 24, causing ultrasonic ridges 24 to meld into lower case 30, bonding cases 20, 30 together. PCBA 41 is thus encased within upper case 20 and lower case 30.

Since PCBA 41 may be at a slanting angle within upper case 20 and lower case 30, supporting ribs may be added to lower case 30 to support PCBA 41 at this slanting angle. Supporting ribs may be formed at about one-third of the device's length within lower case 30, while end ribs may be formed closer to the insertion end of lower case 30. Dividers 28 on the end of upper case 20 also help to position PCBA 41 at a slanting angle within cases 20, 30 by pushing down the insertion end of PCBA 41.

Dividers 28 may touch the top surface of PCBA 41, providing support between PCBA 41 and upper case 20. This slanting angle allows for thicker chips at the far end of PCBA 41, on the bottom surface of PCBA 41.

Figure 5:
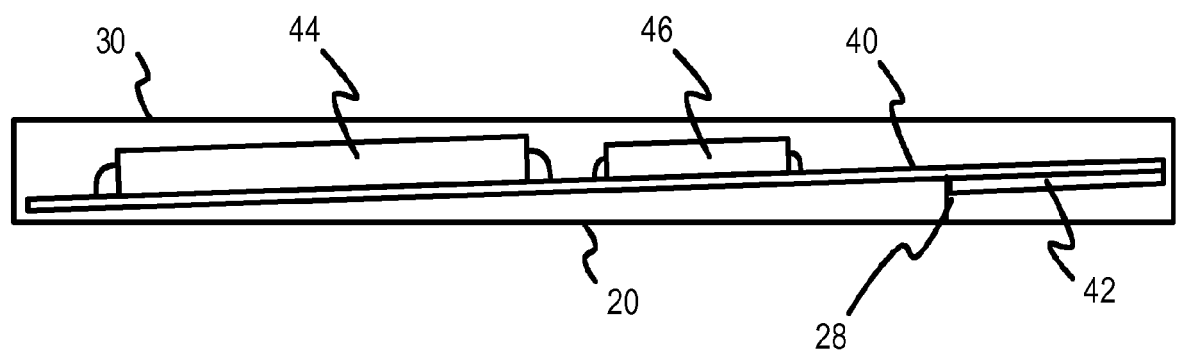
FIG. 5 is a cross-sectional diagram highlighting the slanting of the circuit board.

SD contact pads 42 at the insertion end of PCBA 41 are lowered within the casing because contact openings between dividers 28 in upper case 20 force SD contact pads 42 to be lower within the casing (See FIG. 5).

Switch 70 is inserted onto a switch-slot on lower case 30. Switch 70 can be a slidable or sliding switch that is used to activate write or erasure protection, making the flash memory read-only when switch 70 is activated by the user. Switch 70 may be attached to lower case 30 before assembly or after assembly.

Figure 3A:
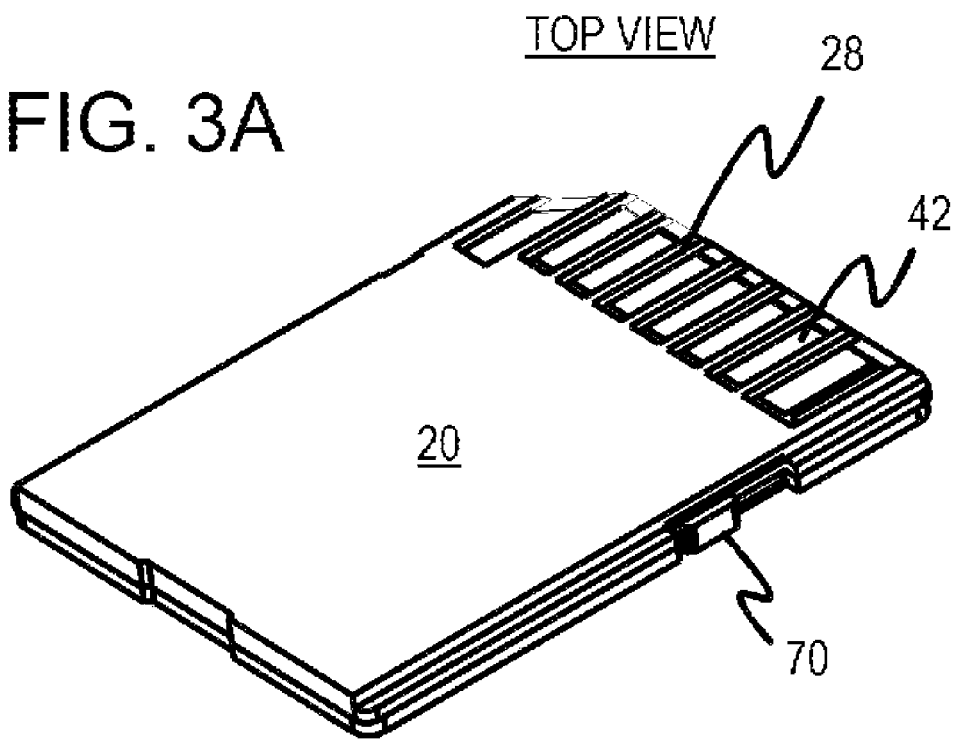
FIGS. 3A-B show views of a final assembled SD flash card.
Figure 3B:
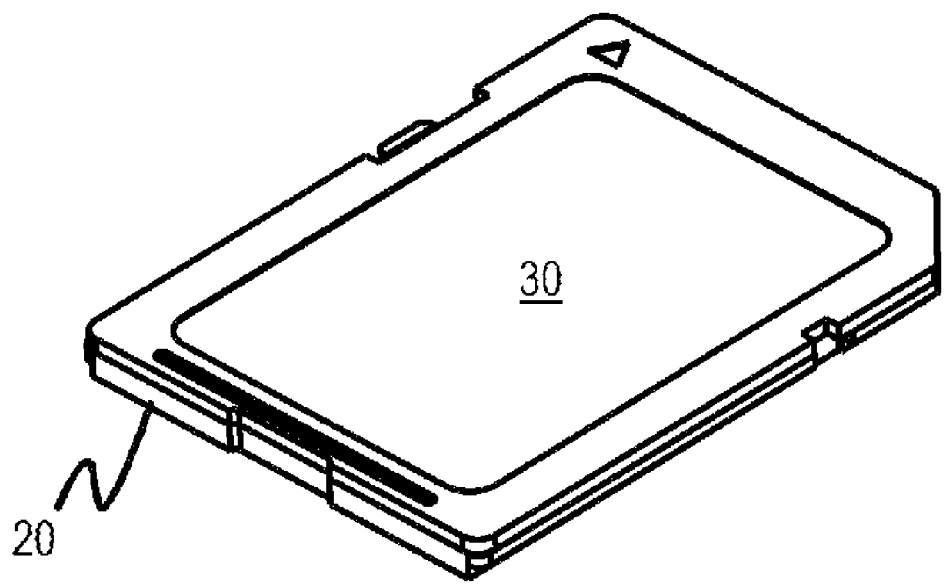

FIGS. 3A-B show views of a final assembled SD flash card. FIG. 3A shows a top view from the back of the final assembled flash-card device, with upper case 20 covering PCBA 41. SD contact pads 42 extend from front openings between dividers 28 in upper case 20. Switch 70 is visible on one side. SD contact pads 42 can be inserted into a SD socket such as on a host computer, allowing the SD card to be read as a mass-storage device, replacing a rotating hard disk. Mass-storage devices are read in large blocks or streams of data, rather than as randomly-addressable words.

FIG. 3B shows a bottom view of the final assembled SD flash card, from the back. Lower case 30 is covering PCBA 41. The side walls visible are from upper case 20 and from lower case 30.

Figure 4A:
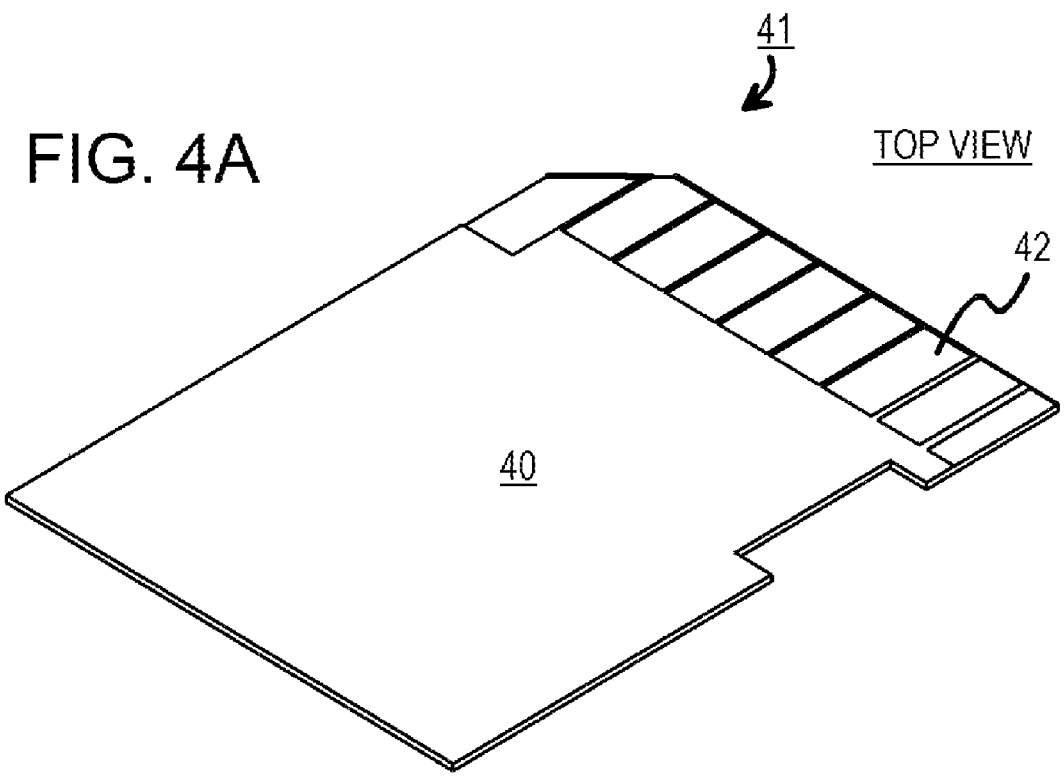
FIGS. 4A-B show the circuit-board assembly in detail.
Figure 4B:
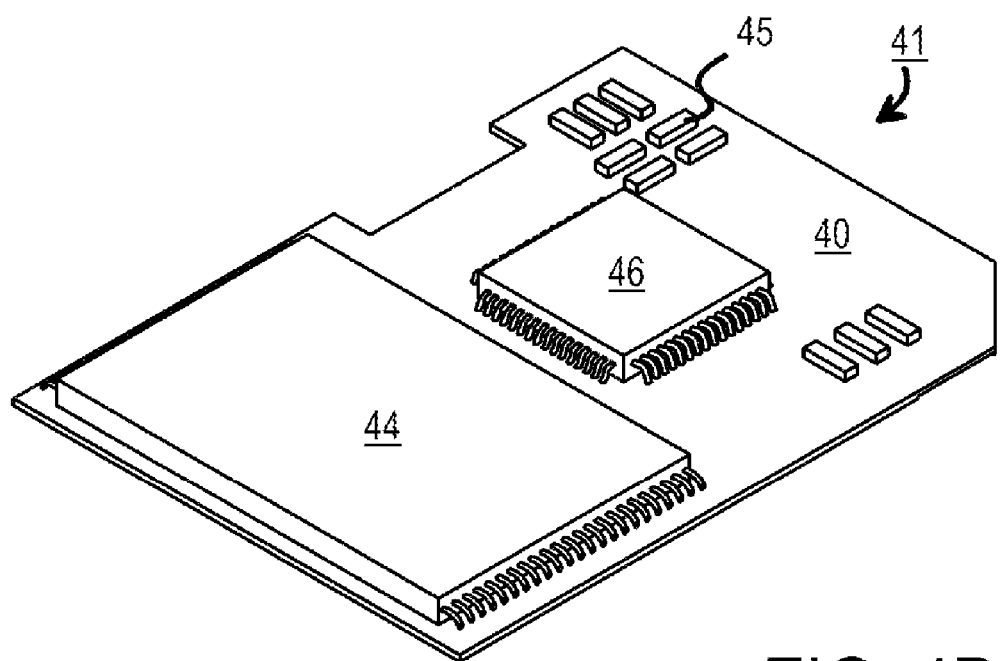

FIGS. 4A-B show the circuit-board assembly in detail. In the top view of FIG. 4A, PCBA 41 includes a circuit board with wiring traces on several layers, and vias or other inter-layer connections. SD contact pads 42 are formed along the front (insertion) end of circuit board 40 using a layout dictated by the SD standard.

In the bottom view of FIG. 4B, flash- memory chip 44 is mounted to the bottom surface of circuit board 40. Controller chip 46 is also mounted to circuit board 40, between flash-memory chip 44 and the insertion end of circuit board 40, which has SD contact pads 42 on the top surface as shown in FIG. 4A. Controller chip 46 can have an SD or other bus interface to communicate with a host over SD contact pads 42. Controller chip 46 can also have a flash controller that reads, erases, and writes blocks of data to flash-memory chip 44, perhaps including wear-leveling and address re-mapping logic and tables. Components 45 can include other electrical components that are soldered to circuit board 40, such as resistors, capacitors, LED's, etc.

Dividers 28 of upper case 20 make contact with the top surface of circuit board 40, between SD contact pads 42 at the insertion (front) end. This contact allows SD contact pads 42 to be in downward position within upper case 20, as required by the SD specification, yet also allows the far (back) end of circuit board 40 to slant upward, making more room for chips 44, 46.

FIG. 5 is a cross-sectional diagram highlighting the slanting of the circuit board. Circuit board 40 has flash-memory chip 44 and controller chip 46 and other components mounted to the bottom surface by the far end, while SD contact pads 42 are formed on the top surface by the insertion end. Lower case 30 and upper case 20 encase circuit board 40 and its components.

Contact openings between dividers 28 in upper case 20 allow SD contact pads 42 to be exposed to the host. Dividers 28 on upper case 20 (the case on the bottom in FIG. 5) force the surface of circuit board 40 downward (upward as shown in FIG. 5) to slant circuit board 40 encased within cases 20, 30. The tops of flash-memory chip 44 and controller chip 46 can press against the inside surfaces of lower case 30 to force the non-insertion end of circuit board 40 upward (downward as shown in FIG. 5) to slant circuit board 40.

Since chips 44, 46 are relatively thick, circuit board 40 is slanted upward at the far end, allowing more space for chips 44, 46. The position of the insertion end of circuit board 40 with SD contact pads 42 is fixed by the SD mechanical specification to be near the device center-line, at about half the device thickness. Thus circuit board 40 is near the center-line at the insertion end, but slants upward toward the far end, providing additional space for chips 44, 46. This slanting of circuit board 40 more efficiently uses the volume within upper and lower case 20, 30. If circuit board 40 were to have no slant and remain at the device center-line, chips 44, 46 would extend above upper case 20, requiring that upper case 20 be raised, increasing device thickness.

Metal Switch-Bar Process—FIGS. 6-7

FIG. 6 shows a parts view of a Secure-Digital flash card with a metal switch-bar that is molded into the upper case. An ultrasonic-press process encloses PCBA 41 between upper case 20 and lower case 30. Metal bar 72 is fitted into upper case 20 during molding of upper case 20 to form a secure attachment. Alternately, metal bar 72 could be fitted into slots in upper case 20 for a less secure attachment. Switch 70 is fitted over metal bar 72 during assembly. Metal bar 72 provides a smoother sliding action of switch 70 than a plastic bar does, improving the user's perception of quality of the flash-card device.

PCBA 41 is a circuit board such as a printed-circuit board (PCB) with wiring traces, and has flash-memory chip 44 and a controller chip and components soldered to the bottom surface (facing upward in this view) of the circuit board. PCBA 41 also has SD contact pads 42 (hidden on the other side of PCBA 41) formed along the front edge of the circuit board. SD contact pads 42 mate with socket pads on a SD socket that the Secure-Digital flash card fits into, such as on a host or in an electronic device.

Upper case 20 has contact openings between dividers 28 along the front side. SD contact pads 42 are exposed by contact openings between dividers 28 when PCBA 41 is assembled into upper case 20, thus allowing SD contact pads 42 to make electrical connection when inserted into an SD socket.

During assembly, PCBA 41 is fitted inside upper case 20. PCBA 41 may be fitted at a slanting angle within upper case 20 (See FIG. 5) to allow SD contact pads 42 to fit within contact openings between dividers 28 while still having room within upper case 20 and lower case 30 for chips mounted to the bottom side of PCBA 41. The slanting angle may be 1-2 degrees in some embodiments, depending on the length of and the thickness between the upper and lower cases.

The sub-assembly of PCBA 41 inside upper case 20 is then fitted to lower case 30. Ultrasonic ridges 24 are formed on the perimeter rim of upper case 20 and touch the rim of lower case 30 as cases 20, 30 are fitted together. Ultrasonic energy is applied while pressing cases 20, 30 together, causing ultrasonic vibrations along ultrasonic ridges 24. Ultrasonic ridges 24 are heated by the friction of rubbing against the rim of lower case 30 and the pressure from the ultrasonic press machine. This heating partially melts the plastic of ultrasonic ridges 24, causing ultrasonic ridges 24 to meld into lower case 30, bonding cases 20, 30 together. PCBA 41 is thus encased within upper case 20 and lower case 30.

Dividers 28 on the end of upper case 20 also help to position PCBA 41 at a slanting angle within cases 20, 30 by pushing down the insertion end of PCBA 41. This slanting angle allows for thicker chips at the far end of PCBA 41, on the bottom surface of PCBA 41. SD contact pads 42 at the insertion end of PCBA 41 are lowered within the casing because contact openings between dividers 28 in upper case 20 force SD contact pads 42 to be lower within the casing (See FIG. 5).

Switch 70 is inserted over metal bar 72 on upper case 20. Switch 70 can be a slidable switch that is used to activate write or erasure protection, making the flash memory read-only when switch 70 is activated by the user. Switch 70 may be attached to metal bar 72 of upper case 20 before assembly or after assembly.

Label 31 can be applied to the surface of lower case 30 during assembly. Label 31 can have an adhesive backing of glue or another adhesive can be painted onto lower case 30 before label 31 is applied. Label 31 can contain product information, logos, electrical and product specifications, etc.

Figure 7A:
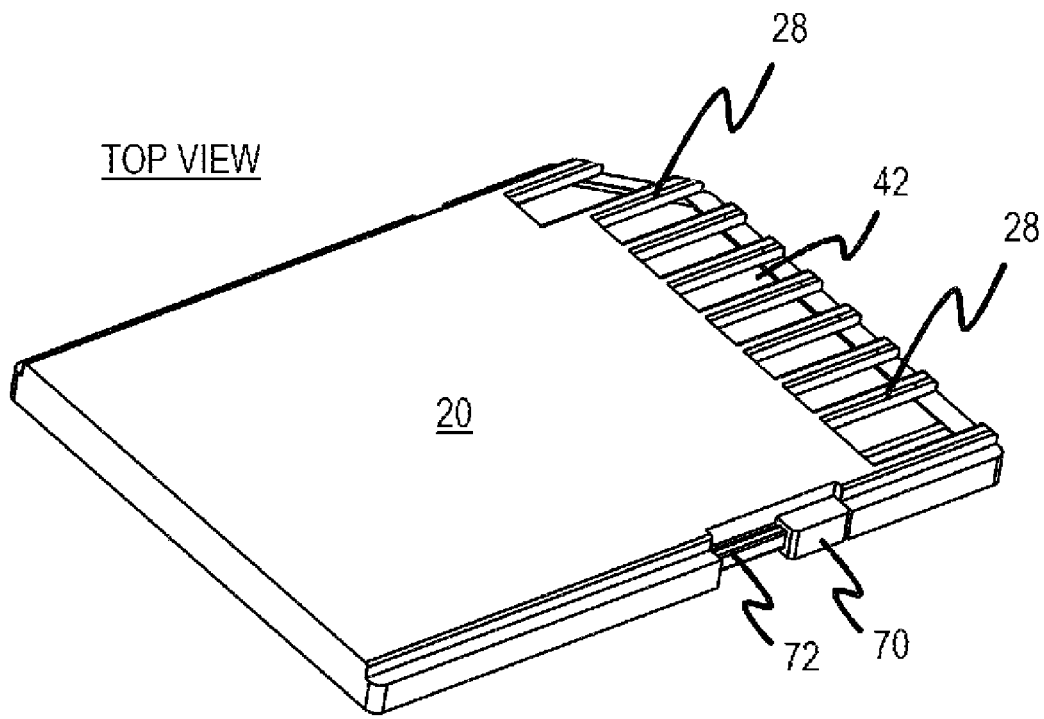
FIGS. 7A-B show views of a final assembled SD flash card with a metal switch-bar.
Figure 7B:
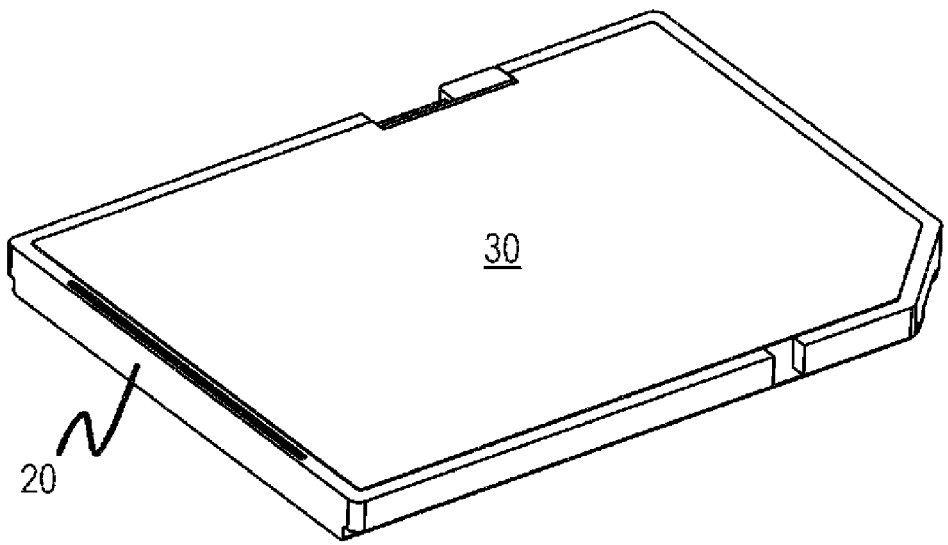

FIGS. 7A-B show views of a final assembled SD flash card with a metal switch-bar. FIG. 7A shows a top view from the back of the final assembled flash-card device, with upper case 20 covering PCBA 41. SD contact pads 42 extend from front openings between dividers 28 in upper case 20. Switch 70 is visible on one side, and slides along metal switch-bar 72.

FIG. 7B shows a bottom view of the final assembled SD flash card, from the back. Lower case 30 is covering PCBA 41. The side walls visible are from upper case 20 and from lower case 30. Label 31 is not shown, but may cover some or all of the surface of lower case 30 shown in FIG. 7B.

Figure 8A:
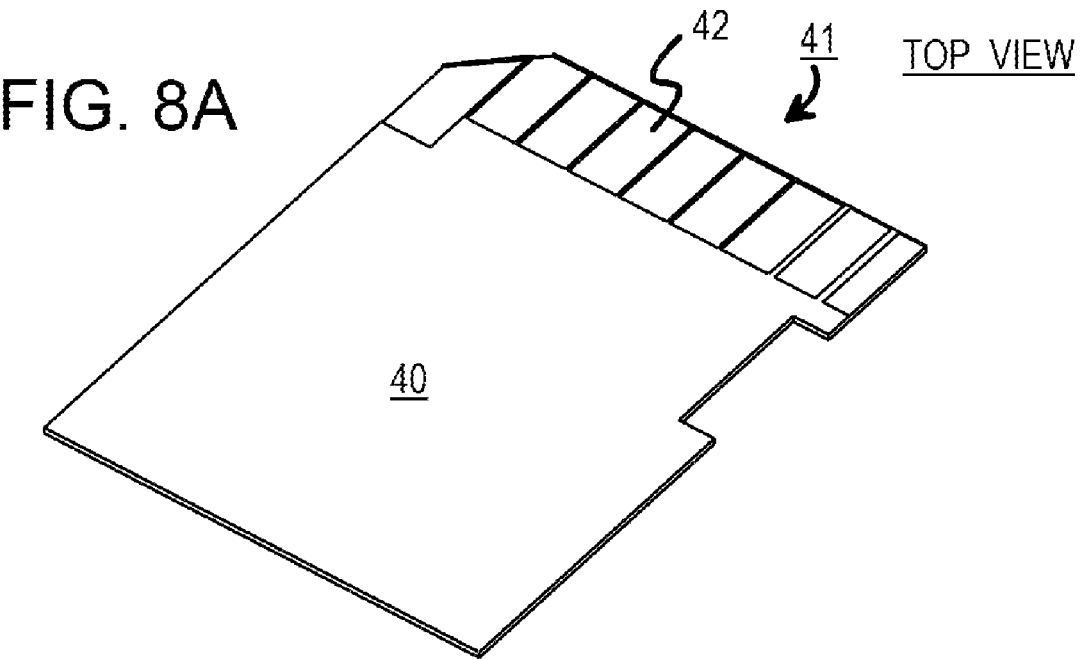
FIGS. 8A-B show a circuit-board pre-assembly made using an over-molded controller chip process.
Figure 8B:
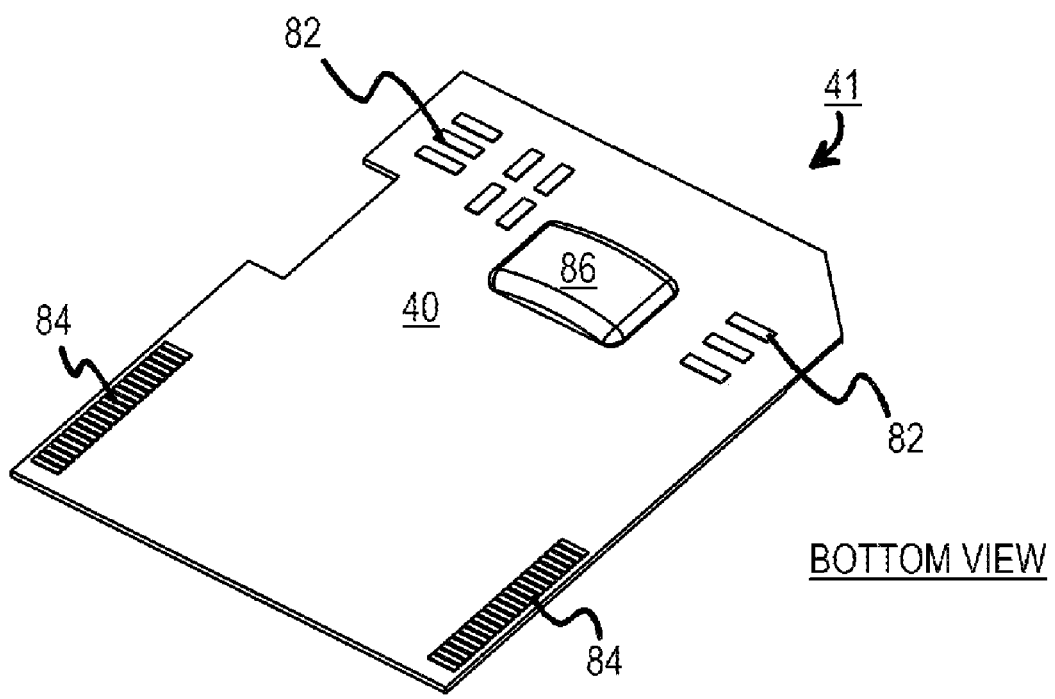
Figure 9:
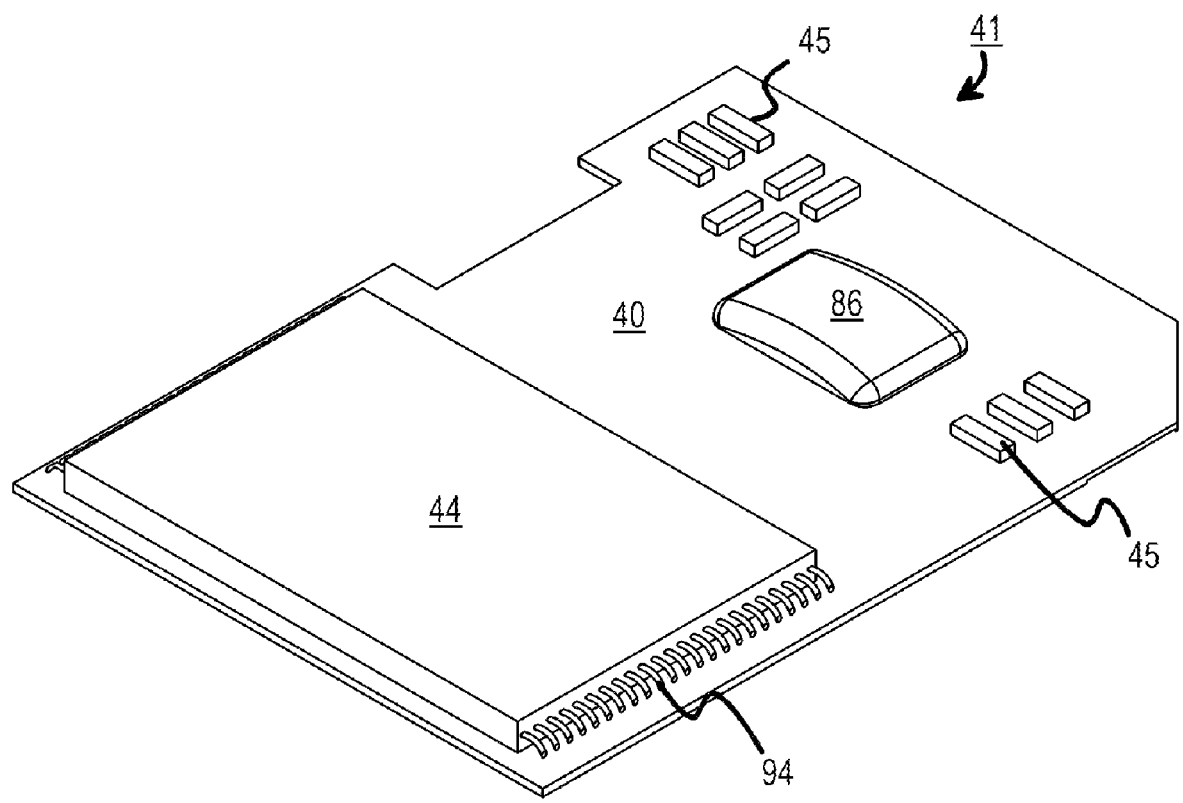
FIG. 9 shows the final circuit-board assembly with an over-molded controller die.

Over-Molded Surface-Mounted Chip Process—FIGS. 8-9

In an alternative design of the flash device, controller chip 46 is a bare unpackaged die that is attached to circuit board 40. Bonding pads on the bare unpackaged die are then wire-bonded with thin wires to pads on circuit board 40. Then molten thermoplastic is molded over the flash controller die and the thin wires to form a molded controller die chip on the circuit-board substrate. Next the solder paste is applied to other areas of circuit board 40 using a special squeegee that avoids controller chip 46, and only applies solder paste to pads for other electronic components and flash-memory chip 44.

FIGS. 8A-B show a circuit-board pre-assembly made using an over-molded controller chip process. In the top view of FIG. 8A, PCBA 41 includes a circuit board with wiring traces on several layers, and vias or other inter-layer connections. SD contact pads 42 are formed along the front (insertion) end of circuit board 40 using a layout dictated by the SD standard.

In the bottom view of FIG. 8B, over-molded controller die 86 is attached to circuit board 40, thin wires are bonded between bonding pads on the controller die and pads on circuit board 40, and plastic is molded over the thin wires and controller die to form over-molded controller die 86 that is attached to circuit board 40. Other components have not yet been attached to circuit board 40 as shown in FIG. 8B.

Chip pads 84 are arranged to receive leads or pins of flash-memory chip 44, while other pads 82 are for receiving leads of other electrical components such as capacitors and resistors. Solder paste is applied to pads 82, 84 while avoiding the area around over-molded controller die 86. Flash-memory chip 44 is then placed onto chip pads 84, and components 45 are placed onto other pads 82. Then the sub-assembly is heated to solder flash-memory chip 44 to chip pads 84, and components 45 to other pads 82. The temperature of this heating step is sufficiently low to not melt the plastic of over-molded controller die 86.

FIG. 9 shows the final circuit-board assembly with an over-molded controller die. Over-molded controller die 86 is directly attached to circuit board 40 by thin wires for wire-bonding, and protected by an over-molded plastic. Over-molded controller die 86 can have an SD or other bus interface to communicate with a host over SD contact pads 42. Over-molded controller die 86 can also have a flash controller that reads, erases, and writes blocks of data to flash-memory chip 44, perhaps including wear-leveling and address re-mapping logic and tables.

Flash-memory chip 44 is mounted to the bottom surface of circuit board 40 using leads 94 that are soldered to chip pads 84 of FIG. 8B. Components 45 can include other electrical components that are soldered to circuit board 40, such as resistors, capacitors, LED's, etc that are soldered to other pads 82 of FIG. 8B.

ALTERNATIVE EMBODIMENTS

Several other embodiments are contemplated by the inventors. For example, while a connector and a controller chip for the SD protocol has been described, other bus protocols and physical connectors could be substituted, such as small-computer system interface (SCSI), compact flash, serial AT attachment (SATA), and PCI Express, ExpressCard, Firewire (IEEE 1394), integrated device electronics (IDE), Multi-Media Card (MMC), etc. While Secure-Digital (SD) has been described, other variations of SD may be substituted, such as Super Digital, which may not have some security features of SD.

Controller chip 46 and flash-memory chip 44 may be packaged in a variety of integrated circuit packages, such as Thin-Outline Small Package (TOSP), Ball-Grid Array (BGA), Chip-On-Board (COB), or in a multi-chip package.

The upper and lower cases could be formed from metal in some embodiments, such as when using screws, or could be plastic, such as for ultrasonic bonding. Combinations of plastic and metal could be used. The form factor for the flash-card device could vary.

Directional terms such as upper, lower, up, down, top, bottom, etc. are relative and changeable as the device is rotated, flipped over, etc. These terms are useful for describing the device but are not intended to be absolutes. In some embodiments the lower case could be smaller than the upper case, or vice-versa.

An alternative process may use heat-activated adhesive film, or high viscosity adhesives. The adhesive can be applied to the case surface by manual or automatic using dispensing machine. After dispensing adhesives onto the case surface, immediately press the case against PCBA. A press fixture may be used to hold the case and PCBA in position. The curing time is about several minutes.

Various combinations of processes may be used. For example, adhesive films may be used with a screw-together method rather than with snap-tabs. Alignment sockets may be added to other embodiments. Center lines or more numerous ridges may be added to stiffen the upper or lower cases. Various cosmetic features, decals, and indicia may be added.

Rather than mount packaged IC's onto the surfaces of the circuit board, unpackaged die may be mounted using die-bonding techniques. Using unpackaged die rather than packaged die may reduce the size and weight of the PCBA.

Snap-tabs with more complex movable latching teeth or extensions or locking portions may also be used in many variations. Different thicknesses and dimensions can be substituted for the examples given. The number and arrangement of chips may vary.

Various design features such as cutouts, holes, supporting underside ribs, or bumps can be added. A variety of materials may be used for the connector, circuit boards, metal pads, cases, etc. Plastic cases can have a variety of shapes and may partially or fully cover different parts of the circuit board and connector, and can form part of the connector itself. Metal covers rather than plastic may be used in some embodiments. Various features can have a variety of shapes and sizes. Oval, round, square, rectangular, trapezoidal, and other shapes may be used.

Rather than use the flash-card device only for flash-memory storage, additional features may be added. For example, a music player may include a controller for playing audio from MP3 data stored in the flash memory. An audio jack may be added to the device to allow a user to plug in headphones to listen to the music. A wireless transmitter such as a BlueTooth transmitter may be added to the device to connect to wireless headphones rather than using the audio jack. Infrared transmitters such as for IRDA may also be added. A BlueTooth transceiver to a wireless mouse, PDA, keyboard, printer, digital camera, MP3 player, or other wireless device may also be added. The BlueTooth transceiver could replace the connector as the primary connector. A BlueTooth adapter device could have a connector, a RF (Radio Frequency) transceiver, a baseband controller, an antenna, a flash memory (EEPROM), a voltage regulator, a crystal, a LED (Light Emitted Diode), resistors, capacitors and inductors. These components may be mounted on the PCB before being enclosed into a plastic or metallic enclosure. Of course, the size of the flash-card device may increase.

A fingerprint scanner, display, keypad, power supply, or other accessories could be added to the flash-drive device with suitable changes to the casing to allow space and user access to these devices if needed. Alternately, the flash device may delete these components and just have input/output interface circuit 5, processing unit 2, and a flash memory device in the arrangement of FIG. 1. Power may be supplied through the connector. Input/output interface circuit 5 may be integrated with processing unit 2 as controller chip 45.

An indicator lamp such as a light-emitting diode (LED) could be added to the PCBA. The case may have an opening, thinning of the plastic, or a lens to allow light from the indicator lamp to shine through the case. A light pipe or light channel could be added.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another a tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An internally-slanted flash-memory device comprising:
   an upper case;
   a lower case;
   a printed-circuit board assembly (PCBA) that comprises:
   a circuit board having wiring traces;
   a flash-memory chip mounted to a first surface of the circuit board;
   a controller chip mounted to the first surface of the circuit board, the controller chip having a input/output interface circuit for interfacing to an external computer, and a processing unit for accessing the flash-memory chip in response to commands from the external computer received by the input/output interface circuit;
   contact pads formed on a second surface of the circuit board, the contact pads for connecting the controller chip to the external computer;
   wherein the second surface is opposite the first surface;
   wherein the upper case is attached to the lower case during assembly with the PCBA between the upper case and the lower case, with the contact pads exposed through contact-pad openings between the upper case and the lower case, the upper and lower cases encapsulating the circuit board; and
   supporting dividers formed on the lower case between pairs of the contact-pad openings, the supporting dividers supporting the circuit board at a slanting angle to a primary surface the upper case, wherein the first surface of the circuit board and the primary surface of the upper case are non-parallel at the slanting angle,
   wherein the flash-memory chip is block-addressable and not randomly-addressable.

2. The internally-slanted flash-memory device of claim 1 wherein the upper case has an upper exterior surface that is a largest external surface on the upper case;
   wherein the lower case has a lower exterior surface that is a largest external surface on the lower case;
   wherein the upper exterior surface is substantially parallel to the lower exterior surface;
   wherein the first surface and the second surface of the circuit board are parallel to each other, but are not parallel to the upper exterior surface or to the lower exterior surface;
   wherein the circuit board is mounted within the upper case and lower case at the slanting angle.

3. The internally-slanted flash-memory device of claim 2 further comprising:
   end supporting ribs formed on the lower case, for further supporting the circuit board at the slanting angle within the lower case.

4. The internally-slanted flash-memory device of claim 3 wherein the contact pads are on an insertion end of the circuit board and the contact-pad openings are on an insertion end of the upper case and the lower case;
   wherein the end supporting ribs are formed on the insertion end of the lower case;
   wherein the first surface of the circuit board faces the lower case and is supported at the slanting angle by the end supporting ribs contacting the first surface of the circuit board.

5. The internally-slanted flash-memory device of claim 4 wherein each of the end supporting ribs contacts the first surface of the circuit board directly underneath a contact pad in the contact pads on the second surface of the circuit board, whereby downward pressure on the contact pads is supported by the end supporting ribs.

6. The internally-slanted flash-memory device of claim 4 wherein a far-end spacing from the far end of the circuit board to the lower exterior surface of the lower case is greater than an insertion-end spacing from the insertion end of the circuit board to the lower exterior surface of the lower case,
   whereby spacing is increased at the far end by the slanting angle of the circuit board.

7. The internally-slanted flash-memory device of claim 6 wherein the flash-memory chip is mounted to the first surface closer to the far end than to the insertion end of the circuit board;
   wherein the far end of the circuit board is tilted upward by the slanting angle to increase space for the flash-memory chip between the circuit board and the lower case,
   whereby space for the flash-memory chip is increased by the slanting angle of the circuit board.

8. The internally-slanted flash-memory device of claim 1 wherein the contact pads form a physical interface for a Secure-Digital flash card interface or an extension of a Secure-Digital flash card interface without digital-rights-management support.

9. The internally-slanted flash-memory device of claim 1 wherein the contact pads form a physical interface for a compact flash, serial AT attachment (SATA), PCI Express, ExpressCard, or Firewire (IEEE 1394) interface.

10. The internally-slanted flash-memory device of claim 1 further comprising:
    ultrasonic ridges formed on sidewalls of the upper case;
    wherein the ultrasonic ridges bond into the lower case in response to frictional heating when the upper case is ultrasonically vibrated with respect to the lower case during assembly to ultrasonically bond the upper case into the lower case;
    whereby the upper case and the lower case are assembled by an ultrasonic bonding method.

11. The internally-slanted flash-memory device of claim 10 further comprising:
    positioning posts on the upper case;
    positioning holes in the lower case that receive the positioning posts during assembly to align the upper case to the lower case.

12. The internally-slanted flash-memory device of claim 1 wherein the controller chip comprises:
    an over-molded controller die;
    thin wires that connect die bonding pads to contact pads on the circuit board; and
    a plastic over-mold that covers the thin wires and the over-molded controller die.

13. The internally-slanted flash-memory device of claim 1 further comprising:
   a metal switch-bar that is molded into the upper case; and
   a sliding switch that is placed on the metal switch-bar during assembly, the sliding switch for indicating when the flash-memory chip is write-protected and the controller chip prevents writes to the flash-memory chip.

14. A method for manufacturing a slanted flash-memory device comprising:
   forming contact pads on an upper surface of a printed-circuit board (PCB);
   forming a PCB assembly by soldering a flash-memory chip onto a lower surface of the PCB and soldering a controller chip to the lower surface of the PCB;
   wherein the contact pads are for carrying signals from an external computer to the controller chip to instruct the controller chip to read blocks of data from the flash-memory chip;
   forming an upper case by molding plastic;
   forming ultrasonic ridges on the upper case when forming the upper case;
   forming a lower case by molding plastic, the lower case having an outside surface as a largest external surface of the lower case;
   forming a rim on the lower case when forming the lower case;
   forming supporting dividers on the upper case when forming the upper case, the supporting dividers for supporting the PCB assembly at a slanted angle within the upper case wherein the upper and lower surfaces of the PCB are not parallel with the outside surface of the lower case when assembled;
   fitting the PCB assembly into the upper case to form a sub-assembly of the PCB assembly and the upper case;
   aligning the upper case to the lower case until the ultrasonic ridges touch the rim of the lower case;
   pressing the upper case into the lower case while applying ultrasonic energy to ultrasonically bond the upper case to the lower case through the ultrasonic ridges;
   wherein the upper and lower surfaces of the PCB are not parallel with the outside surface of the lower case;
   whereby the PCB assembly is at the slanted angle within the lower case when the slanted flash-memory device is assembled using an ultrasonic bonding process.

15. The method of claim 14 wherein soldering the controller chip to the lower surface of the PCB further comprises:
   die-attaching a bare die of the controller chip to the lower surface of the PCB;
   attaching thin wires between bonding pads on the bare die and die pads on the lower surface of the PCB; and
   covering the thin wires and the bare die with an over-molding plastic to form an over-molded controller die on the lower surface of the PCB.

16. The method of claim 15 wherein soldering the flash-memory chip onto the lower surface of the PCB comprises:
   applying solder paste to chip contact pads on the lower surface of the PCB while avoiding application of solder paste to the over-molded controller die on the lower surface of the PCB;
   placing leads of the flash-memory chip into solder paste on the chip contact pads; and
   heating the leads to solder the flash-memory chip to the lower surface of the PCB.

17. The method of claim 14 further comprising:
   forming openings in the upper case that expose the contact pads after assembly;
   wherein the openings are formed when forming the upper case by molding plastic, wherein the openings are formed between the supporting dividers.

18. The method of claim 15 wherein the contact pads are below a center-line between the upper case and the lower case when assembled;
   wherein the PCB is slanted upward and is above the center-line at the flash-memory chip,
   whereby the PCB straddles the center-line for an asymmetric flash-memory device design.

19. A portable flash-memory device comprising:
   upper case means for partially encasing the portable flash-memory device;
   lower case means for partially encasing the portable flash-memory device;
   a printed-circuit board assembly (PCBA) that comprises:
   circuit board means for connecting chips with wiring traces;
   flash-memory chip means for storing blocks of data, the flash-memory chip means being mounted to a first surface of the circuit board means, wherein the flash-memory chip means are block-addressable and not randomly-addressable;
   controller chip means, mounted to the first surface of the circuit board means, for controlling access to the flash-memory chip means, the controller chip means comprising an input/output interface means for interfacing to an external computer, and processing unit means for accessing the flash-memory chip means in response to commands from the external computer received by the input/output interface means;
   contact pad means, formed on a second surface of the circuit board means, for connecting the controller chip means to the external computer; and
   slant means, formed on the upper case means, for supporting the circuit board means at a slanted angle to a centerline between the lower case means and the upper case means, wherein the circuit board means is slanted and not parallel to the centerline;
   wherein the upper case means is attached to the lower case means during assembly with the PCBA between the upper case means and the lower case means, with the contact pad means passing through a plurality of openings in the upper case means.

20. The portable flash-memory device of claim 19 further comprising:
   wherein the flash-memory chip means and the controller chip means are located in a first region having the circuit board means farther above the centerline than in a second region, wherein the contact pad means is formed in the second region of the circuit board means,
   whereby the circuit board means is slanted.

21. The portable flash-memory device of claim 20 wherein the slant means comprises:
   divider means, formed on the upper case means between the plurality of openings in the upper case means, for supporting the second surface of the circuit board means at a slanted angle to the upper case means.

22. The portable flash-memory device of claim 21 further comprising:
   switch bar means on the upper case means, for receiving a switch that slides along the switch bar means, the switch indicating to the controller chip means to prevent writing to the flash-memory chip means.

* * * * *